(12) United States Patent
Barnes et al.

(10) Patent No.: US 7,657,421 B2
(45) Date of Patent: Feb. 2, 2010

(54) SYSTEM AND METHOD FOR IDENTIFYING AND DEFINING IDIOMS

(75) Inventors: Thomas H. Barnes, Austin, TX (US); Yen-Fu Chen, Austin, TX (US); John W. Dunsmoir, Round Rock, TX (US); Sheryl S. Kinstler, Dripping Springs, TX (US); Carol S. Walton, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 582 days.

(21) Appl. No.: 11/426,961

(22) Filed: Jun. 28, 2006

(65) Prior Publication Data
US 2008/0004862 A1 Jan. 3, 2008

(51) Int. Cl.
*G06F 17/28* (2006.01)
*G06F 17/27* (2006.01)
*G06F 17/21* (2006.01)

(52) U.S. Cl. .................. 704/4; 704/1; 704/9; 704/10

(58) Field of Classification Search ............ None
See application file for complete search history.

(56) References Cited

U.S. PATENT DOCUMENTS

| 5,475,586 | A | * | 12/1995 | Sata et al. ................ 704/2 |
| 5,541,838 | A | | 7/1996 | Koyama et al. |
| 5,995,934 | A | | 11/1999 | Tang |
| 6,094,634 | A | | 7/2000 | Yahagi |
| 6,438,515 | B1 | * | 8/2002 | Crawford et al. ............. 704/5 |
| 6,453,280 | B1 | | 9/2002 | Yang |
| 7,349,924 | B2 | * | 3/2008 | Lyle ..................... 707/104.1 |
| 2002/0128845 | A1 | * | 9/2002 | Thomas et al. .......... 704/270.1 |

FOREIGN PATENT DOCUMENTS

GB 2211641 A * 7/1989

* cited by examiner

*Primary Examiner*—Matthew J Sked
(74) *Attorney, Agent, or Firm*—Yee & Associates, P.C.; William H. Steinberg; Rudolf O. Siegesmund

(57) ABSTRACT

The "Idiom Identifier" converts an original text document to a "neutral" form containing no punctuation, no capital letters, and having only a single space between each word. Neutral form text also removes hidden markup such as line breaks, paragraph breaks or page breaks. The Idiom Identifier performs an enhanced text search to locate idioms listed in a library file. The Idiom Identifier marks each identified idiom in a marked-up copy of the original text document. A reader can click on the marked-up idiom to see a definition of the idiom.

20 Claims, 4 Drawing Sheets

SYSTEM AND METHOD FOR IDENTIFYING AND DEFINING IDIOMS

FIELD OF THE INVENTION

The present invention relates generally to data processing and file management and relates specifically to querying a file to identify variations of an idiom.

BACKGROUND OF THE INVENTION

The English language, and particularly English language literature contains many idioms. Idioms are sayings or phrases that cannot be understood from the individual meanings of the words because the combination of words contain a secondary meaning. The word "idiom" as used herein includes, but is not limited to, metaphors, clichés, slang, colloquialisms, proverbs and sayings. There are over 20,000 idioms in the English language.

An example of an English language idiom is "it's water under the bridge." This idiom refers to a past experience or conflict that has been forgotten, or is no longer important or relevant. The idiom compares the memories of the past event to water that has passed under a bridge.

When learning a new language, idioms can be particularly difficult to identify and understand. One reason for this difficulty is that the same idiom can be expressed in different ways. For example, the "it's water under the bridge" idiom can be expressed in at least five different ways as: (1) "it's water under the proverbial bridge"; (2) "its water under the bridge"; (3) "it's like water under a bridge"; (4) "it's just water under the bridge"; or (5) "it is merely water under a very old-fashioned bridge." Merely memorizing the phrase "it's water under the bridge" may not help a reader recognize each variation of the idiom. Variations in punctuation, verb tense and the addition of modifiers like adjectives and adverbs can obscure the idiom.

Using a computer to search electronic text to identify and define idioms would be useful for people learning a new language. Computerized text searches, however, share the difficulties human readers have when identifying idioms. A standard text search algorithm of "it's water under the bridge" would not identify any of the five variations above. Variations in punctuation, verb tense or the addition of modifiers like adjectives and adverbs interrupt the text string, preventing the text search algorithm from identifying the idiom. A more sophisticated search algorithm is required to identify idioms in electronic text.

An enhanced text search algorithm known in the art searches for a combination of words within close proximity of each other rather than searching for an exact string. In the "it's water under the bridge" example above, a search on the terms "water" next to "under" and within several words of the terms "it's" and "bridge" would identify only three of the variations listed above. The variations with "its" and "it is" are still not identified.

A need exists for a system and method that can search a text document, identify any variation of an idiom, and provide a way for readers to click on the identified idiom for a simple definition.

SUMMARY OF THE INVENTION

The "Idiom Identifier" meets the need identified above by converting an original text document to a "neutral" form containing no punctuation, no capital letters, and having only a single space between each word. Neutral form text also removes hidden markup such as line breaks, paragraph breaks or page breaks. The Idiom Identifier performs an enhanced text search to locate idioms listed in a library file. The Idiom Identifier marks each identified idiom in a marked-up copy of the original text document. A reader can click on the marked-up idiom to see a definition of the idiom.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Idiom Identifier."

Figure 1:
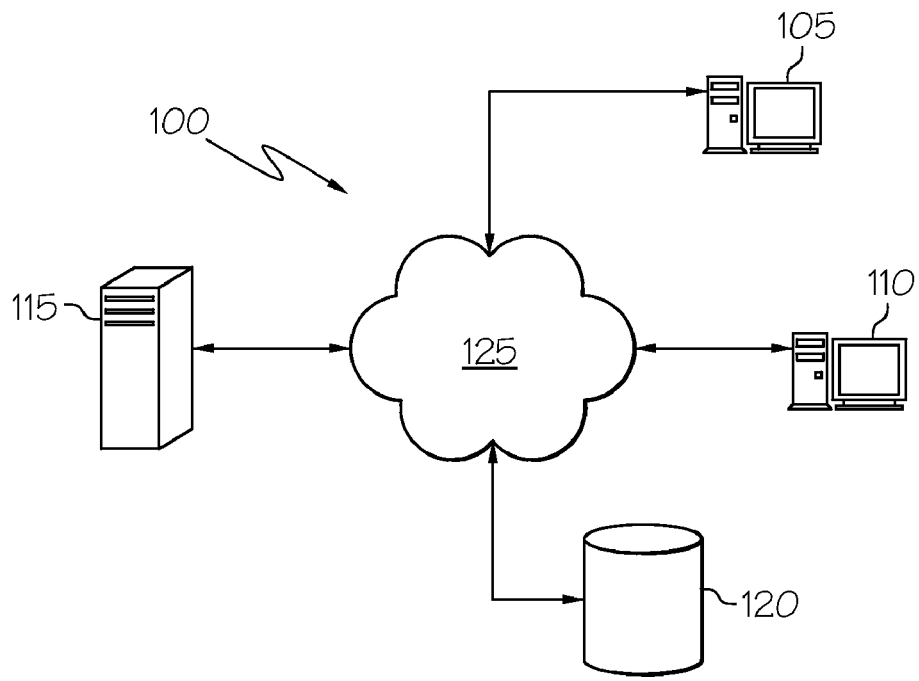
FIG. 1 is an exemplary computer network

Additionally, the Idiom Identifier is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
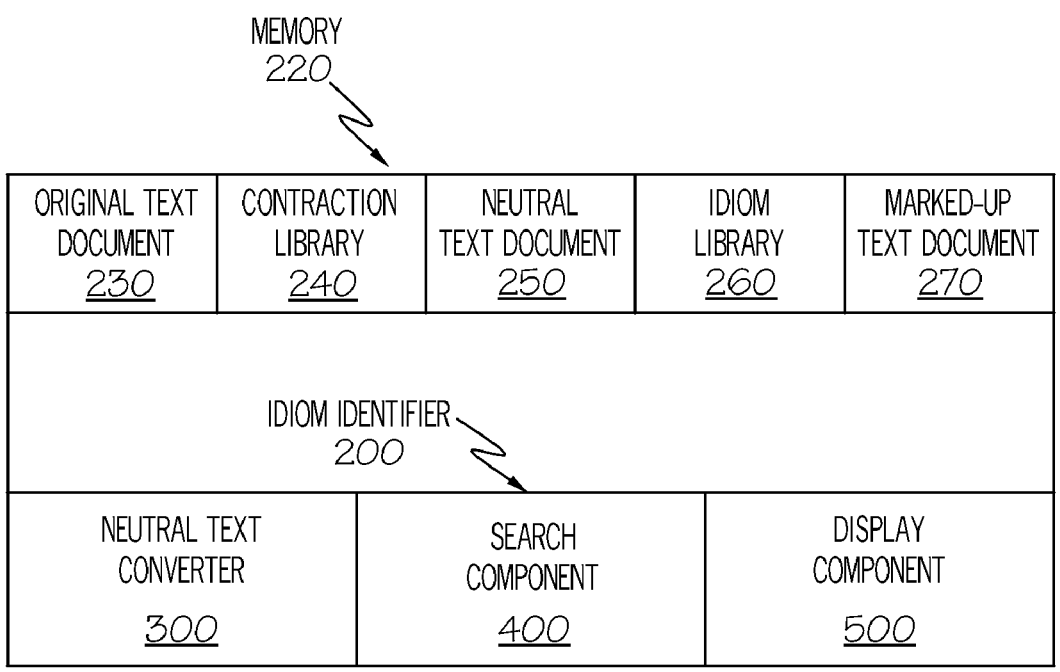
FIG. 2 describes programs and files in a memory on a computer

Idiom Identifier 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Idiom Identifier 200 has three components: Neutral Text Converter 300, Search Component 400 and Display Component 500. Of particular import to Idiom Identifier 200, memory 220 may include Original Text Document 230, Contraction Library 240, Neutral Text Document 250, Idiom Library 260 and Marked-up Text Document 270 with which Idiom Identifier 200 interacts.

Figure 3:
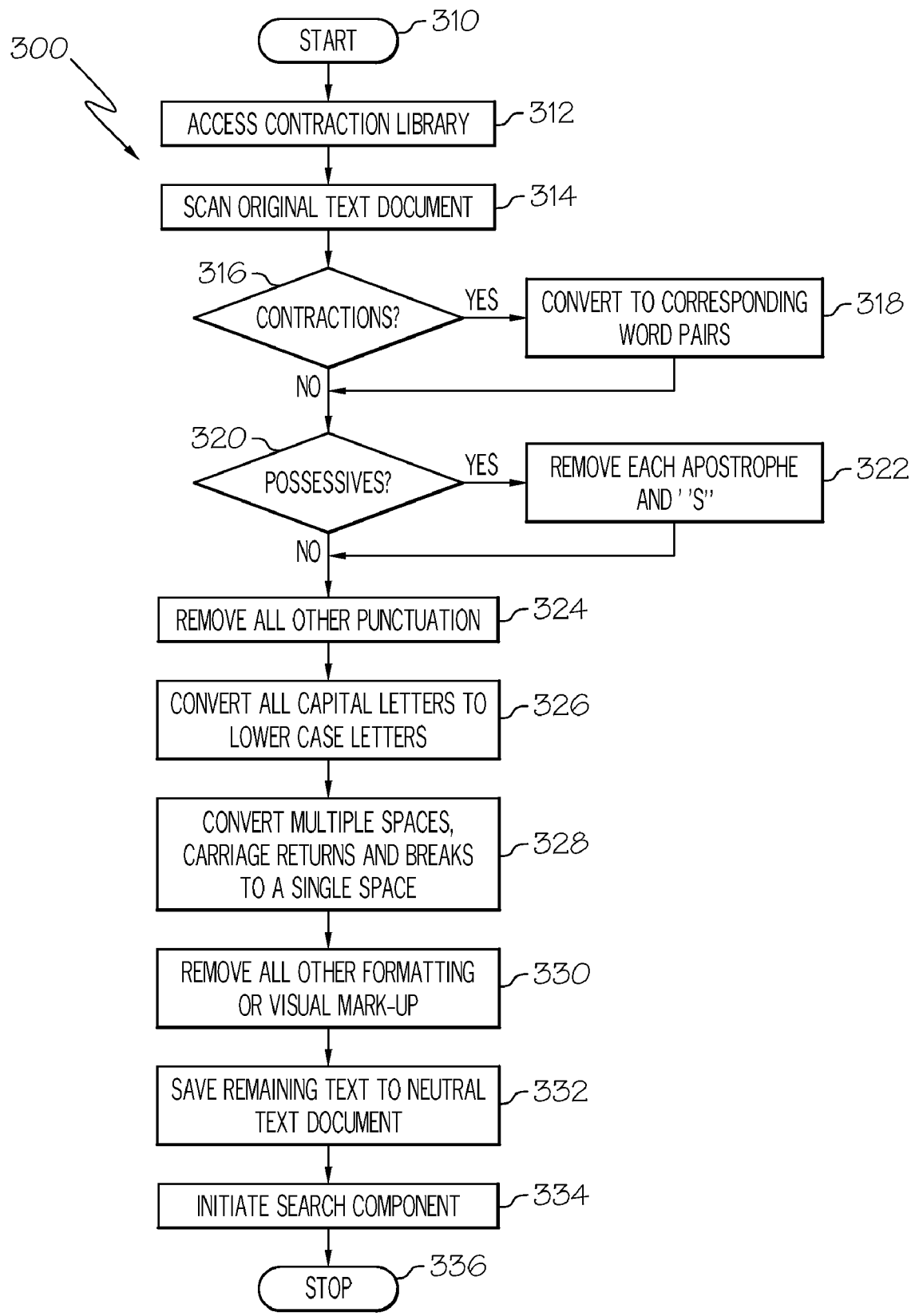
FIG. 3 is a flowchart of a neutral text converter

Neutral Text Converter 300, shown in FIG. 3, starts (310) when initiated by someone reading an original text document 230, generally through Display Component 500. Neutral Text Converter 300 accesses contraction library 240 (312) and starts to scan original text document 230 (314). If Neutral Text Converter 300 detects any contractions used in original text document (316), Neutral Text Converter 300 converts the contractions to the corresponding word pairs (318). Contraction library 240 contains a list of contractions and the corresponding word pair. For example, Neutral Text Converter 300 changes any instance of "can't" to "cannot." If Neutral Text Converter 300 detects any possessives (320), the apostrophe and letter "s" are removed (322). Neutral Text Converter 300 removes all other punctuation marks (324) and converts all capital letters to lower case (326). Neutral Text Converter 300 replaces all multiple spaces, carriage returns and line, paragraph or page breaks with single spaces (328) and removes any other formatting or visual mark-ups (330). Neutral Text Converter 300 saves the remaining text to neutral text document 250 (332). After saving the neutral text, Neutral Text Converter 300 initiates Search Component 400 (334) and stops (336).

Figure 4:
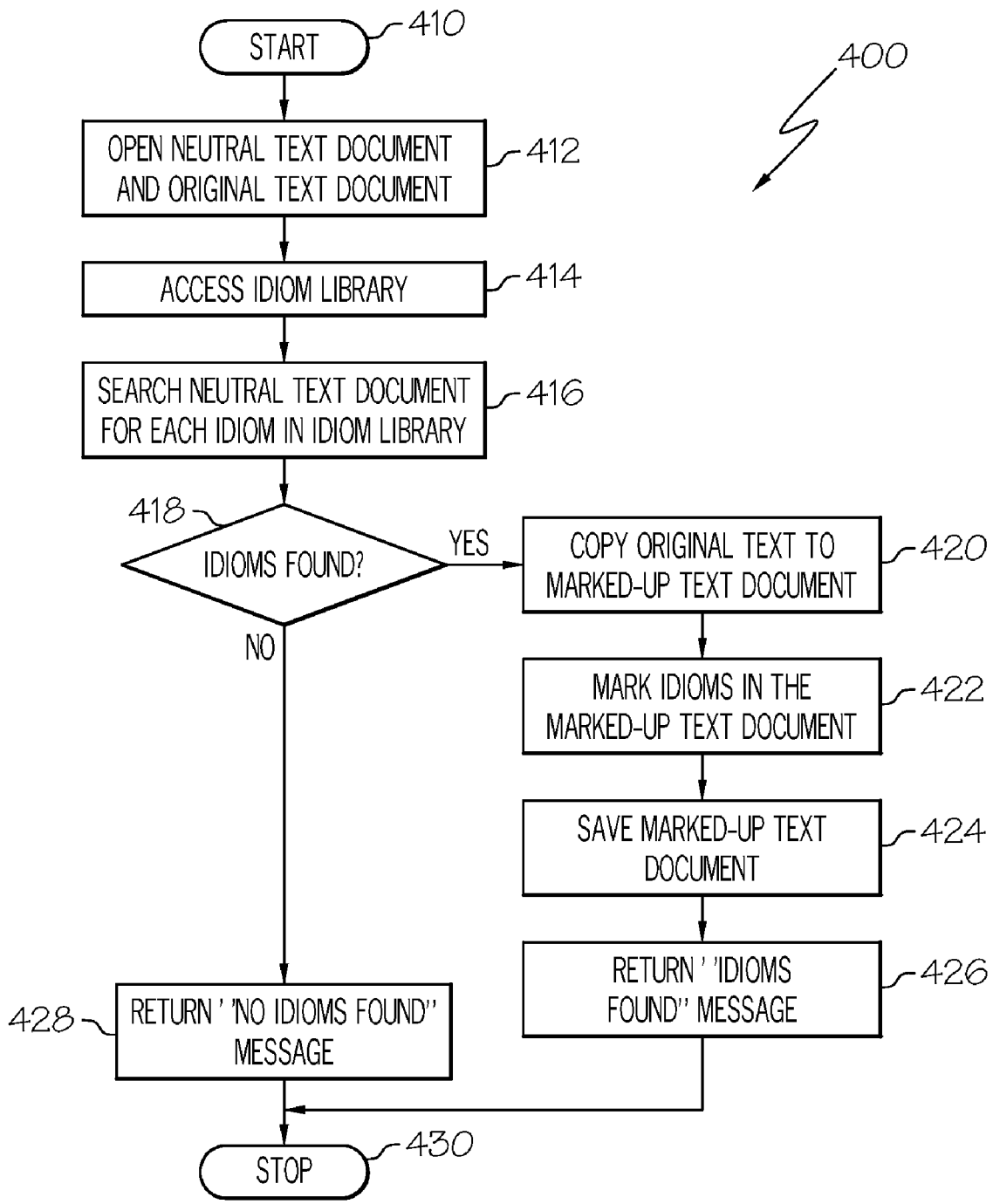
FIG. 4 is a flowchart of a search component

Search Component 400 starts (410) when initiated by Neutral Text Converter 300, as shown in FIG. 4. Search Component 400 opens both neutral text document 250 and original text document 230 (412), as well as accessing idiom library 260 (414). Idiom library 260 contains a list of idioms, common variations and search criteria for each idiom. For example, the search criteria for the idiom "it's water under the bridge" might be: "'water" next to "under" and within several words of the terms "it's" and "bridge." Additionally, the search criteria can require that all the key words for an idiom must appear within a defined span, such as a span of ten words, to avoid overlap with other idioms. In any case, all the key words used in a specific idiom's search criteria should be found within the same sentence. Also, the search can be conducted from a list of words requiring that one of the listed words be present. Search Component 400 searches neutral text document for idioms using the search criteria from idiom library 260 (416). Various methods of searching text using keywords and relational placement of words are known in the art. If the search identifies any idioms (418), Search Component 400 copies original text 230 with formatting to marked-up text document 270 (420). Search Component 400 marks every instance of an idiom in marked-up text document 270 (422). The idioms can be marked in many ways, including highlighting, underlining, or changing the color of the idiom. The idiom is also marked with additional hidden information with the idiom's definition. The hidden information can be viewed in Display Component 500. Search Component 400 saves marked-up text document 270 (424) and sends an "idioms found" message to Display Component 500 (426). If no idioms are identified, Search Component 400 returns a "no idioms found" message to Display Component 500 (428). After sending the "idioms found" or "no idioms found" message, Search Component 400 stops (430).

An additional embodiment of Search Component 400 allows for searches using only a subset of Idiom Library 260. Using only a subset of more common idioms allows for faster searching, since the search is scalable linearly. For example, identifying idioms in the book "Pride and Prejudice" using Idiom Identifier 200 with a full library of 20,000 idioms would take a few seconds, but searching for just a subset of the full library containing only 1,000 idioms would take 1/20$^{th}$ of the time. Similarly, Idiom Identifier 200 would take five times longer to identify all idioms in a book that is five times longer than "Pride and Prejudice."

Figure 5:
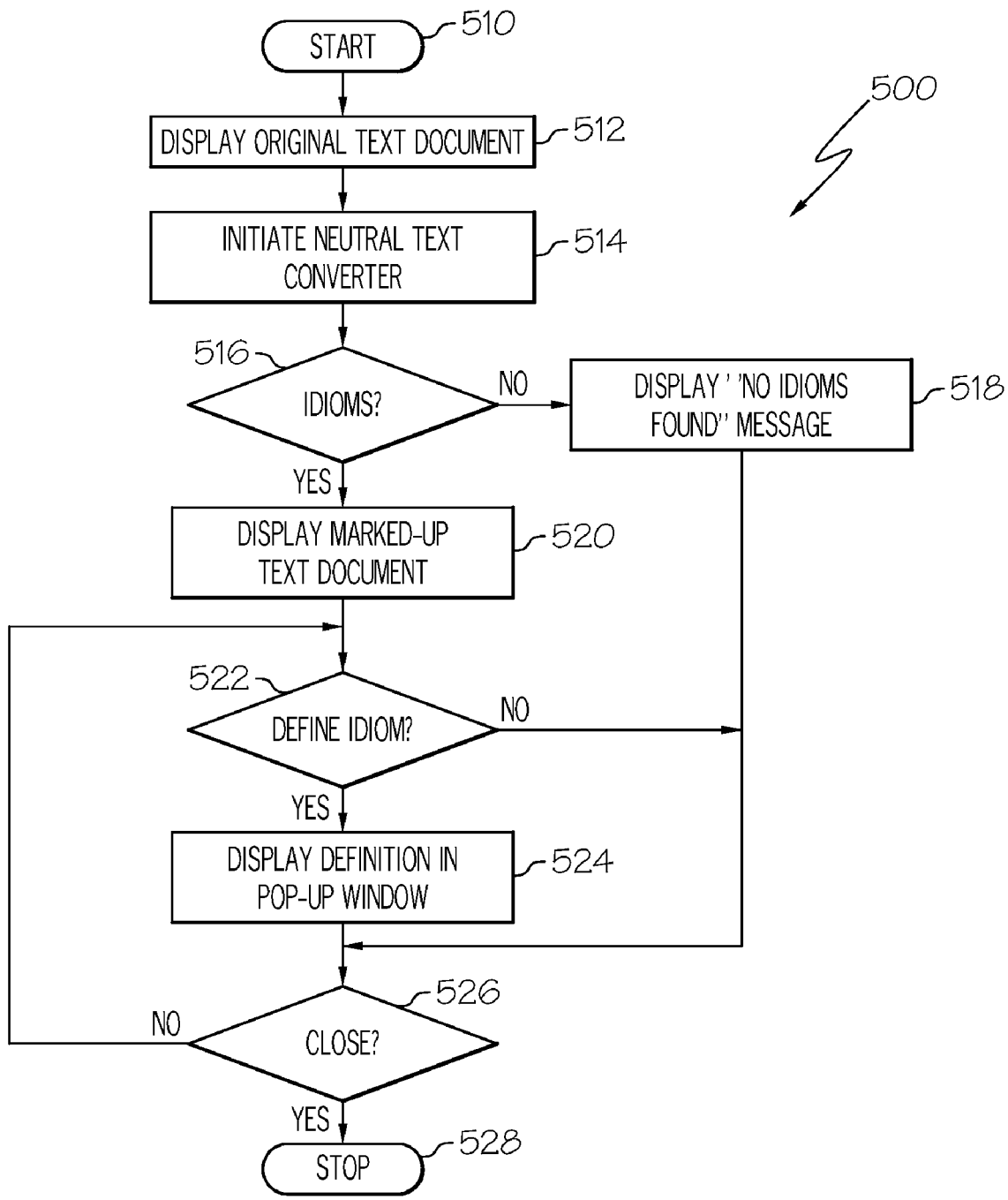
FIG. 5 is a flowchart of a display component

FIG. 5 shows Display Component 500, which starts whenever someone viewing electronic text initiates Idiom Identifier 200 while viewing original text document 230 (510). Display Component 500 can be a stand-alone text reader or a plug-in to other commercial text readers, including word processing programs, internet browsers and e-book readers. Display Component 500 displays the content of original text document 230 (512) and initiates Neutral Text Converter 300 (514) which in turn initiates Search Component 400. Display Component 500 waits for a message from Search Component 400 (516). If Search Component 400 returns a "no idioms found" message, the "no idioms found" message is displayed for the person viewing original text document 230 (518). If Search Component 400 returns a "idioms found" message, Display Component 500 displays marked-up text document 270 (520) in place of original text document 230. Viewers of marked-up text document 270 can hover over or click on the marked idioms to see a hidden definition of the idiom (522). The idiom's definition displays in a pop-up window or pane in the text reader (524). Viewers of original text document 230 can continue reading marked-up text document 270 and seeing definitions (522-524) until they choose to close (526), which stops Display Component 400 (528).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for identifying idioms in a text document, the computer implemented process comprising:

opening an electronic plain language text file containing a plurality of idioms;

converting the plain language text file to a neutral text file;

searching for each of a plurality of idioms in the neutral text file using a library of idioms, wherein the library of idioms contains the plurality of idioms, a plurality of common variations of the plurality of idioms and a search criteria for each of the plurality of idioms, and wherein the search criteria includes searching for a pair of adjacent words in an idiom; and marking each of a plurality of found idioms visually in an electronic display and in a marked-up text file;

wherein the term idiom includes metaphors, clichés, slang, colloquialisms, proverbs and sayings.

2. The computer implemented process of claim 1 further comprising adding definitions of the marked idioms as hidden information to the marked-up text file.

3. The computer implemented process of claim 2 further comprising displaying the definition for a marked idiom whenever a user reading the marked-up text file selects the marked idiom.

4. The computer implemented process of claim 1 wherein the library of idioms contains common variations of each idiom and the search terms correspond with all common variations of each idiom.

5. The computer implemented process of claim 1 wherein the search terms for an idiom must be found within a specified range of words.

6. The computer implemented process of claim 1 wherein the search is conducted using a subset of the library of idioms and corresponding search terms.

7. The computer implemented process of claim 1 wherein the neutral text file contains no punctuation, capital letters, contractions, possessives or formatting breaks, and all words are separated by a single space; and wherein the neutral text file is created by accessing a contraction library, scanning the electronic plain language text file, and responsive to detecting each of a plurality of contractions matching a contraction in the contraction library, converting each of the plurality of contractions to a corresponding word pair, and by removing all punctuation marks in the electronic plain language text file, by converting all capital letters in the electronic plain language text file to lower case, and by replacing all multiple spaces, carriage returns and line, paragraph or page breaks in the electronic plain language text file with single spaces, and by removing any formatting or visual mark-ups in the electronic plain language text file.

8. An apparatus for identifying idioms in a text document, the apparatus comprising:

a processor;

a memory connected to the processor;

an electronic plain language original text file in the computer memory, wherein the text file contains a plurality of idioms;

an idiom identifier program in the memory operable to open the plain language text file, convert the plain language text file to a neutral text file, search for each of a plurality of idioms in the neutral text file using a library of idioms, wherein the library of idioms contains the plurality of idioms, a plurality of common variations of the plurality of idioms and a search criteria for each of the plurality of idioms, and wherein the search criteria includes searching for a first word and a second word in the idiom where the first word and the second word are adjacent, and mark each of a plurality of found idioms visually in an electronic display and in a marked-up text file;

wherein the term idiom includes metaphors, clichés, slang, colloquialisms, proverbs and sayings.

9. The apparatus of claim 8 wherein the idiom finder program is further operable to add definitions of the marked idioms as hidden information to the marked-up text file.

10. The apparatus of claim 9 wherein the idiom finder program is further operable to display the definition for a marked idiom whenever a user reading the marked-up text file selects the marked idiom.

11. The apparatus of claim 8 wherein the library of idioms contains common variations of each idiom and search terms correspond with all common variations of each idiom.

12. The apparatus of claim 8 wherein an idiom must be found within a specified range of words.

13. The apparatus of claim 8 wherein the search is conducted using a subset of the library of idioms and corresponding search terms.

14. The apparatus of claim 8 wherein the neutral text file contains no punctuation, capital letters, contractions, possessives or formatting breaks, and all words are separated by a single space, wherein the neutral text file is created by accessing a contraction library, scanning the electronic plain language text file, and responsive to detecting each of a plurality of contractions matching a contraction in the contraction library, converting each of the plurality of contractions to a corresponding word pair, and by removing all punctuation marks in the electronic plain language text file, by converting all capital letters in the electronic plain language text file to lower case, and by replacing all multiple spaces, carriage returns and line, paragraph or page breaks in the electronic plain language text file with single spaces, and by removing any formatting or visual mark-ups in the electronic plain language text file.

15. A computer readable memory containing a plurality of instructions to cause a computer to identify a plurality of idioms in a text document, the plurality of instructions comprising:

a first instruction to open the plain language text file;

a second instruction to convert the plain language text file to a neutral text file;

a third instruction to search for the plurality of idioms in the neutral text file using a library of idioms wherein the library of idioms contains the plurality of idioms, a plurality of common variations of the plurality of idioms and a search criteria for each of the plurality of idioms, and wherein the search criteria includes searching for a first word and a second word in the idiom where the first word and the second word are adjacent; and a fourth instruction to mark each of a plurality of found idioms visually in an electronic display and in a marked-up text file;

wherein the term idiom includes metaphors, clichés, slang, colloquialisms, proverbs and sayings.

16. The computer readable memory of claim 15 further comprising a fifth instruction to add definitions of the marked idioms as hidden information to the marked-up text file.

17. The computer readable memory of claim 16 further comprising a fifth instruction to display the definition for a marked idiom whenever a user reading the marked-up text file selects the marked idiom.

18. The computer readable memory of claim 15 wherein the library of idioms contains common variations of each idiom and the search terms correspond with all common variations of each idiom.

19. The computer readable memory of claim 15 wherein the search is conducted using a subset of the library of idioms and corresponding search terms.

20. The computer readable memory of claim 15 wherein the neutral text file contains no punctuation, capital letters, contractions, possessives or formatting breaks, and all words are separated by a single space, wherein the neutral text file is created by accessing a contraction library, scanning the electronic plain language text file, and responsive to detecting each of a plurality of contractions matching a contraction in the contraction library, converting each of the plurality of contractions to a corresponding word pair, and by removing all punctuation marks in the electronic plain language text file, by converting all capital letters in the electronic plain language text file to lower case, and by replacing all multiple spaces, carriage returns and line, paragraph or page breaks in the electronic plain language text file with single spaces, and by removing any formatting or visual mark-ups in the electronic plain language text file.

* * * * *